(12) United States Patent
Canright et al.

(10) Patent No.: US 7,281,005 B2
(45) Date of Patent: Oct. 9, 2007

(54) BACKWARD AND FORWARD NON-NORMALIZED LINK WEIGHT ANALYSIS METHOD, SYSTEM, AND COMPUTER PROGRAM PRODUCT

(75) Inventors: Geoffrey Canright, Oslo (NO); Kenth Engo-Monsen, Tonsberg (NO)

(73) Assignee: Telenor ASA, Fornebu (NO)

( * ) Notice: Subject to any disclaimer, the term of this patent is extended or adjusted under 35 U.S.C. 154(b) by 390 days.

(21) Appl. No.: 10/687,602

(22) Filed: Oct. 20, 2003

(65) Prior Publication Data

US 2005/0086260 A1   Apr. 21, 2005

(51) Int. Cl.
*G06F 7/00* (2006.01)
*G06F 17/30* (2006.01)

(52) U.S. Cl. .......................................................... 707/5
(58) Field of Classification Search ................ 707/1–5, 707/104.1, 7; 715/500, 501.1
See application file for complete search history.

(56) References Cited

U.S. PATENT DOCUMENTS

| | | | |
|---|---|---|---|
| 6,112,202 A | 8/2000 | Kleinberg | |
| 6,112,203 A | 8/2000 | Bharat et al. | |
| 6,182,065 B1 | 1/2001 | Yeomans | |
| 6,285,999 B1 | 9/2001 | Page | |
| 6,321,220 B1 | 11/2001 | Dean et al. | |
| 6,353,825 B1 | 3/2002 | Ponte | |
| 6,356,899 B1 * | 3/2002 | Chakrabarti et al. ........... | 707/5 |
| 6,457,028 B1 | 9/2002 | Pitkow et al. | |
| 6,526,440 B1 | 2/2003 | Bharat | |
| 6,560,600 B1 | 5/2003 | Broder | |
| 6,591,261 B1 | 7/2003 | Arthurs | |
| 6,636,848 B1 * | 10/2003 | Aridor et al. .................. | 707/3 |
| 6,665,665 B1 | 12/2003 | Ponte | |
| 6,701,312 B2 | 3/2004 | Lau et al. | |
| 6,738,678 B1 * | 5/2004 | Bharat et al. ................. | 700/48 |
| 7,076,483 B2 * | 7/2006 | Preda et al. ................... | 707/5 |
| 7,117,206 B1 * | 10/2006 | Bharat et al. .................. | 707/5 |
| 2002/0038350 A1 | 3/2002 | Lambert et al. | |
| 2002/0129014 A1 | 9/2002 | Kim et al. | |
| 2002/0198869 A1 | 12/2002 | Barnett | |
| 2003/0003707 A1 | 1/2003 | Takahisa | |
| 2004/0006742 A1 | 1/2004 | Slocombe | |
| 2005/0171946 A1 * | 8/2005 | Maim ............................ | 707/5 |

FOREIGN PATENT DOCUMENTS

| | | |
|---|---|---|
| EP | WO 03/098370 A2 | 11/2003 |
| JP | 2001-319129 | 11/2001 |
| WO | WO 01/84351 A2 | 11/2001 |

OTHER PUBLICATIONS

Ziyang Wang (2003), Improved Link-Based Algorithms for Ranking Web Pages.*

(Continued)

*Primary Examiner*—Alford Kindred
*Assistant Examiner*—Merilyn Nguyen
(74) *Attorney, Agent, or Firm*—Oblon, Spivak, McClelland, Maier & Neustadt, P.C.

(57) ABSTRACT

A method, system, and computer program product for hypertext link analysis that includes independently employing non-normalized backward and forward operators to obtain two independent weights for each document in a hypertext-linked graph, for subsequent ranking and analysis.

32 Claims, 8 Drawing Sheets

OTHER PUBLICATIONS

Ravi Kumar, Prabhakar Reghavan and Sridhar Rajagopalan and Andrew Tomkins (2002), The Web and Social Networks, pp. 32-36.*

R. Lempel and S. Moran (2001), Salsa: The Stochastic Approach for Link-Structure Analysis, pp. 131-160.*

Kazunari Sugiyama, Kenji Hatano, Masatoshi Yoshikawa and Shunsuke Uemura (2003), Refinement of TF-IDF Schemes for Web Pages using their Hyperlinked Neighboring Pages, pp. 198-207.*

R. Lempel et al., "The Stochastic Approach for Link-Structure Analysis (SALSA) and The TKC Effect"; Jul. 21, 2003; p. 1-23.

Krishma Bharat, "A Search Engine based on Expert Documents"; Aug. 27, 2003; pp. 1-4.

The PageRank Citation Ranking: Bringing Order to the Web; Jan. 29, 1998; p. 1-17.

Soumen Chakrabarti et al., "Mining the Link Structure of the World Wide Web"; Feb. 1999; p. 1-12.

Jon M. Kleinberg, "Authoritative Sources in a Hyperlinked Environment"; Journal of the ACM, vol. 46, No. 5; Sep. 1999; p. 604-632.

Chris Ding et al. "PageRank, HITS and a Unified Framework for Link Analysis", The Twenty-Fifth Annual International ACM SIGIR Conference on Research and Development in Information Retrieval; Aug. 11-15, 2002, p. 353-354.

Sergey Brin, Lawrence Page, "The anatomy of a large-scale hypertextual Web search engine", Computer Networks and ISDN Systems 30; 1998; pp. 107-117.

Allan Borodin et al., "Finding Authorities and Hubs From Link Structures on the World Wide Web"; May 1-5, 2001.

Taher H. Haveliwala; "Efficient Computation of PageRank"; Stanford University; Oct. 18, 1999; pp. 1-15.

Esko Nuutila, et al.; "On Finding the Strongly Connected Components in Directed Graph"; Laboratory of Information Processing Science Helsinki University of Technology, Otakaari 1, SF-02150 Espoo, Finland, pp. 1-14.

Robert Endre Tarjan: Depth-First Search and Linear Graph Algorithms. SIAM J. Comput. 1(2): 146-160 (1972).

Xiaodi Huang et al.; "Identification of Clusters in the Web Graph Based on Link Topology" Database Engineering and Applications Symposium, 2003, proceedings, seventh International, Jul. 16-18, 2003, Piscataway, NJ, USA, IEEE, Jul. 16, 2003, pp. 117-122, XPO10647158, ISBN: 0-7695-1981-4.

Ricardo Baeza-Yates et al., "Relating Web Characteristics With Link Based Web Page Ranking", String Processing and Information Retrieval, 2001. Spire 2001. Proceedings, eighth International Symposium on Nov. 13-15, 2001, Piscataway, N.J., USA, IEEE, Nov. 13, 2001, pp. 21-32, XP010583172, ISBN: 0-7695-1192-9.

Zheng Chen et al.: "A Unified Framework for Web Link Analysis" Web Information Systems Engineering, 2002. Wise 2002. Proceedings of the third International Conference on Dec. 12-14, 2002, Piscataway, N.J., USA, IEEE, Dec. 12, 2002, pp, 63-70, XPO10632781, ISBN: 0-7695-1766-8.

Michaelangelo Diligenti et al., "Web Page Scoring Systems for Horizontal and Vertical Search", Proceedings of the 11th International Conference on World Wide Web—WWW2002, May 7, 2002, pp. 508-516, XP002353433, Hawaii, USA ISBN: 1-58113-449-5.

Brian D. Davison: "Unifying Text and Link Analysis", Eighteenth International Joint Conference on Artificial Intelligence, Online! 2003, XP002353434 Bethlehem, PA, USA Retrieved from the Internet: URL: http://www,cs,cmu,edu,{dunja/TextLink2003/papers/DavisonTextLink03.pdf> 'retrieved on Nov. 11, 2005!.

Stuart K. Card, et al., "The WebBook and the Web Forager: An Information Workspace for the World-Wide Web"; Xerox Palo Alto Research Center: Apr. 13, 1996; pp. 111-113; CHI '96 Vancoouver; XP 000657809.

Taher H. Haveliwala; "Efficient Computation of PageRank"; Stanford University; Oct. 18, 1999; pp. 1-15.

Esko Nuutila, et al.; "On Finding the Strongly Connected Components In Directed Graph"; Laboratory of Information Processing Science Helsinki University of Technology, Otakaari 1, SF-02150 Espoo, Finland, pp. 1-14, 1994.

Robert Endre Tarjan: Depth-First Search and Linear Graph Algorithms, SIAM J. Comput. 1(2): 146-160 (1972).

* cited by examiner

BACKWARD AND FORWARD NON-NORMALIZED LINK WEIGHT ANALYSIS METHOD, SYSTEM, AND COMPUTER PROGRAM PRODUCT

BACKGROUND OF INVENTION

1. Field of Invention

The invention includes a method, system, and computer program product for ranking information sources which are found in a distributed network with hypertext links. The software/firmware implementations of the method constitute one component of a system for searching a distributed information system aimed at giving a node ranking based on the disclosed method of hypertext link analysis. A complete system may also have several other components including tools which give ranking scores based on text relevancy; an indexing system; a crawler; and a user interface.

2. Discussion of the Background Art

A problem addressed by many devices and algorithms concerns ranking of hits after a search over a distributed information database. That is, in those cases where the search is guided by topic (keywords)—rather than searching for a specific document—there can often arise more matches to the search criteria—"hits"—than the user can evaluate or even look at. Hits may number in the thousands, or even higher. Therefore ranking of the hits is crucial—without some guide as to which hits are most relevant or valuable, good hits may be lost in a sea of mediocre or irrelevant hits.

When one ranks hits obtained from a keyword search through a hyperlinked database, there are two general types of ranking possible: text relevance ranking, and ranking based on link analysis. Typical search engines use both—although, in many cases, the simplest possible link analysis technique, namely link popularity, is used.

Text relevance ranking is based upon the content of the documents ranked, ie, the relevance of that content to the keywords of the search. Thus, text relevance ranking is mostly insensitive to whether one looks at the entire set of documents (the "whole graph", or WG), or only a subset of documents (a "subgraph").

In contrast, link analysis ranks documents based on their position in a hyperlinked network—a type of "community of documents." Some documents are found to have a "high" or "central" position in the linked network, and so are given high ranking. Because link analysis ranking (except for the naïve link popularity technique) is sensitive to the overall structure of the network (graph), the ranking results are sensitive to whether one looks at the whole graph, or only at a subgraph.

FIGS. 1-4 illustrate the relationships between text relevance ranking and link analysis ranking, for the two cases just described: (i) link analysis ranking based on the whole graph (FIGS. 1 and 2); and (ii) link analysis ranking based on a subgraph (FIGS. 3 and 4). FIGS. 1 and 3 give a simplified general picture for cases (i) and (ii), respectively, while FIGS. 2 and 4 give more details of the system architecture for each case.

We begin with FIG. 1. In this figure, as in all of FIGS. 1-4, we assume that a crawler or other technique has built up a database which describes both the content and the link structure for the whole graph WG. In FIG. 1, we see that link analysis 113 is applied to the whole-graph database 103, so that link analysis ranking of the documents is based on their position in the whole graph, and is thus independent of search terms. Search terms 101 are then used to pick out a set of hits 105, which are then given a text relevance ranking 107. Finally, a ranking from the whole-graph link analysis 113 and the text relevance ranking 107 are combined to give a prioritized hits list 111 net ranking score for each document.

In FIG. 2 the whole-graph database 103 is broken up into its two chief components: a content database 103$a$, and a link structure database 103$b$. Here the link analysis ranking 113$a$ is done based on the whole graph and results in a link analysis database 113$b$. Again we see that keywords 101$a$ are used by a hits list generator 105$a$ to select a hits list 105$b$. This list 105$b$ is then subjected to text relevance ranking 107$a$ and given a text relevance ranking 107$b$, using information from the content database 103$a$. The two rankings 113$b$, 107$b$ are then merged 111$a$, using any of a number of different possible rules, and yield a net ranking score for each document in the hits list. Finally, the ranked list is truncated to a predetermined size 101$b$, so that only the highest-ranked documents 111$b$ are stored and presented.

FIG. 3 portrays in schematic form the use of text relevance ranking, in combination with link analysis ranking, when the latter is applied only to a subgraph. The hits list 105 is ranked according to text relevance 107, and then truncated, before link analysis ranking 113 is performed. The truncated list (subgraph) is fed to the link analysis routine 113, which also needs information (dashed line) from the WG database 101. The resulting subgraph link analysis ranking is finally combined with the text relevance ranking for the same subgraph, to give a merged ranking score 111 for the selected subgraph.

FIG. 4 shows this in more detail. In contrast to FIG. 2, here the hits list 105$b$ that is generated by the hits list generator 105$a$ with the search terms 101$a$ is given a text relevance ranking 107$a$1, and truncated with a truncation size 101$b$, before link analysis ranking is performed. The truncated list 107$b$1 is sent to a subgraph generator 113$c$, which will enlarge the list into an expanded subgraph 113$d$ in such a way as to give a coherent linked "community" of topic-related documents. This expanded subgraph 113$d$ is then subjected both to link analysis ranking 113$a$ and to text relevance ranking 107$a$2 to produce an expanded subgraph relevance ranking 107$b$2 and an expanded subgraph link analysis ranking 113$e$. Finally, the resulting ranking scores are merged 111$a$ to give a single ranking 111$b$ for all documents in the subgraph.

The present invention is directed to a novel method, apparatus, and computer program product for link analysis ranking. As no details about the method of link analysis ranking are shown in any of FIGS. 1-4, the figures do not describe the invention, but rather only give the context in which the present invention, or any other method of link analysis ranking, may be applied.

Currently, there are two broad classes of methods for ranking hits. The first evaluates relevance of the hit according to an analysis of the text in the found document, known as text relevance analysis. For example, if the search keywords are "Norwegian elkhounds", then an algorithm is used to attempt to evaluate the relevance of the search terms in the found document. While this kind of ranking is effective, it can be "fooled" by authors of the documents, who seek a high ranking by repeating important keywords (artificially) many times.

The second class of algorithms evaluates "weight" or "importance" of the hits, based not on their own content, but on how they are located in the larger information network. That is, this class of algorithms employs link analysis to determine how "central" a given hit (document or node) is in a linked network of documents. The present invention is a type of hypertext link analysis.

In hypertext link analysis, hypertext links may be viewed simply as directed arrows pointing from one document to another. The set of documents and hypertext links, taken together, form a directed graph. One then seeks a rule for assigning a weight or importance to each node (document) in the graph, based on the link structure (topology) of the directed graph.

For example, a node with many nodes pointing to it is said to have high indegree. One might assign a weight to each node based solely on its indegree. However, this simple weighting approach—often called the "link popularity" method—is easily fooled, since one can create a large number of spurious documents, all pointing to a single document and giving it artificially high indegree. Nevertheless link popularity ranking is used by a number of commercial search engines, probably due to its simplicity.

Another method, used by both the PageRank algorithm of Google (U.S. Pat. No. 6,285,999, the contents of which are incorporated herein by reference), and by the search engine WiseNut (U.S. Patent Application 2002-0129014, the contents of which are incorporated herein by reference), involves finding the fraction of time a random walker, moving over the graph and following the directed links between nodes, would spend at each node. Clearly, high indegree will contribute positively to this score; however other aspects of the neighborhood of each node are also important. For instance, those nodes pointing to a node having high indegree must also have significant weight; otherwise the high indegree gives little weight to the node in question. Hence the random-walker approach is more sensitive to the overall topological structure of the graph.

One problem with random walks on a directed graph is that they are easily trapped in "sinks"—regions of the graph that have a way in, but no way out. PageRank corrects for sinks by adding completely random hops (independent of the links) with a certain probability while WiseNut corrects for sinks by employing a "page weight reservoir," which is a fictitious node connected bidirectionally to every other node in the graph. Sinks exist in general in distributed hypertext systems; hence every method involving random walks on the directed graph must deal with this problem somehow.

A different approach has been patented (U.S. Pat. No. 6,112,202, the contents of which are incorporated herein by reference) by Jon Kleinberg of Cornell University (USA), based on work done with IBM's CLEVER project. The algorithm is often called HITS ("Hypertext Induced Topic Selection").

HITS is most easily explained by defining two simple operators: F (Forward) and B (backward). In the spirit of a random walk, it is possible to imagine a certain weight (a positive number) associated with each node on a directed graph. The F operator takes the weight $w(i)$ at each node $i$ and sends it Forward, i.e., to all the nodes that are pointed to by node $i$. The B operator sends $w(i)$ against the arrows, i.e., to each node that points towards node $i$.

Next we explain the use of compound operators. Suppose for instance we wish always to first use the F operator, and then follow with the B operator. Using standard matrix notation, this compound operator (F followed by B) would be denoted BF. (Matrix operators act on vectors to the right; hence the rightmost operator acts first.) Similarly, a compound operator composed of B followed by F would be denoted FB.

Henceforth, we use the term "non-compound operator" to refer to the operators F and B (and to their normalized versions, denoted f and b). Of course, any product of operators (matrices) is a new operator (matrix), which can be used to redistribute weights on a graph. However, the compound operators BF and FB have the special property that they always alternate the direction of the "flow" of weight distribution, between flowing "with" the arrows of the hyperlinks, and "against" these arrows. The non-compound operators B and F, in contrast, may each be used in isolation from the other, so that the flow is never reversed. We will see that this difference can have large effects on the results of application of these operators for document ranking.

The HITS algorithm uses repeated application of the compound operators BF and FB, to obtain two importance scores for each node. For instance, after many repetitions of FB, the weights at each node will converge to a stable value, which is then called their "Authority score". Similarly repeated operation by BF gives a "Hub score." Thus, one may say that "good Authorities are pointed to by good Hubs". That is, a node has a high Hub score if it points to many good (or a few VERY good) Authorities—i.e., nodes with relevant content. Also, a node has a high Authority score if it is pointed to by many good (or a few very good) Hubs. Thus the two scores are defined mutually.

There is no known problem with sinks in the HITS approach since one alternates between following the arrows (directed arcs), and moving against them. This approach, and variations of it, are addressed in several patents (e.g., U.S. Pat. Nos. 6,112,203, 6,321,220, 6,356,899, and 6,560,600, the contents of which are incorporated herein by reference), and variations of HITS appear to be in use in the commercial search engines Teoma and AltaVista. This statement is based on examination of publicly available documents about existing search engines, including patents owned by them—in particular, AltaVista has several US patents based on variations of the HITS method.

An important feature of the HITS method is that the operators F and B are not "normalized". A normalized operator does not change the total amount of "weight" present on the graph. For example, a normalized F operator (which we will write as f) will take the weight $w(i)$ and redistribute it to all the nodes "downstream" of node $i$. That is, for the f operator the total weight sent out from node $i$ is equal to the weight found at node $i$. In contrast, the (non-normalized) F operator sends a "copy" of weight $w(i)$ to each node found downstream from $i$—so that the total weight sent out is $w(i)$, multiplied by the outdegree of $i$.

This feature may seem small, but it can have very large effects. There is an algorithm called SALSA (SALSA: The Stochastic Approach for Link-Structure Analysis, ACM Transactions on Information Systems 19(2), PP. 131-160, April 2001, the contents of which are incorporated herein by reference) which is essentially identical to the HITS algorithm, with the one exception that it uses the normalized operators fb and bf. This small change turns out to be highly nontrivial: the Hub and Authority scores for the SALSA algorithm turn out to be, respectively, simply the outdegree and indegree for each node. Thus, normalizing the HITS algorithm (making it "weight-conserving") completely eliminates any sensitivity of the approach to the structure of the graph as a whole—instead, the results are equivalent to the naïve link-popularity approach.

A similar result holds for undirected graphs (where F and B become the same). Here a normalized version simply gives node degree, while the non-normalized version gives a score ("eigenvector centrality") which is nontrivial, and sensitive to the overall graph structure.

One might conclude from this that normalized operators cannot give useful results in ranking nodes on graphs. This conclusion is however not correct. The PageRank algorithm used by Google—described above as a random walk—is equivalent to using the f operator (supplemented by completely random hops to escape sinks). Google is the dominant search engine on the Web today, and its PageRank algorithm is one of the important reasons for that dominance: it gives meaningful and useful ranking results.

One other normalized operator (b) has been briefly mentioned in a research paper by Ding et al. (LNBL Tech Report 49372, updated September 2002, the contents of which are incorporated herein by reference). Ding et al. offer an extremely short (one sentence) discussion of the performance of document ranking based on this operator, implying that it gives similar results to the Hub scores for the HITS algorithm. We use 'DHHZS' (first letters of the authors' last names) to refer to the study of the b operator in this paper.

In the following we summarize the above discussion of methods for ranking using hypertext link analysis. Two methods (SALSA and HITS) use compound operators. Both methods give two types of scores for each document. SALSA however is equivalent to link popularity, while HITS gives nontrivial results that depend on the overall link structure. PageRank uses only a normalized Forward operator, and yields a single score which is also more useful than naïve link counting. Finally, the paper of DHHZS mentions a normalized Backward operator, which also yields a single, nontrivial score.

Shortcomings of the four categories of algorithms listed above (i.e., normalized combined forward/backward; normalized backward only, normalized forward only; non-normalized combined backward/forward) are discussed below.

Some methods do not use link analysis at all in their ranking procedure. These methods include text relevance ranking (discussed above); paid rankings; and ranking according to human judgment.

Paid ranking is a very simple system which has a very different marketing approach and audience. Engines using paid rankings are employed by users for other purposes than finding the best information.

Ranking according to human judgment has the obvious disadvantage that it is too slow and expensive for covering very large systems such as the World Wide Web.

Text ranking is used by all commercial search engines. We expect text ranking to be an important component of any good ranking system. In fact, the best search systems will include both a text ranking system and a system of ranking by link analysis (see, e.g., the Google search engine).

Most, if not all, methods for ranking pages (i.e., documents), which employ hypertext analysis—in use, and/or patented—are based upon one of three methods.

Link popularity. Here one simply counts the number of pages that are linked to a given page (its "degree"). Hyperlinks have a direction; hence each node has two measures of link popularity: indegree (the number of pages pointing to the given page) and outdegree (the number of links coming from the given page). These two different measures of link popularity roughly correspond, respectively, to the Authority and Hub scores in the HITS method.

PageRank. Here a page's rank is roughly equal to the fraction of time a "random surfer" would visit the page. The random surfer follows outlinks only (with a certain probability); otherwise this surfer makes random jumps to a new page. Because PageRank follows only outlinks, its results are more like Authority scores than Hub scores. That is, a high PageRank score indicates that many good pages point to the given page.

HITS. Here there are two "mutually reinforcing" scores. In fact, they are mutually defined: a page is a good Authority if it is pointed to by (many) good Hubs; and a page is a good Hub if it points to (many) good Authorities. The basic idea is similar to link popularity, in that good Authorities are likely to have high indegree, and good Hubs are more likely to have high outdegree.

It is possible to compare the different known methods for ranking by hypertext link analysis. Link popularity has the clear shortcoming described above—that it is too susceptible to artificial means for raising one's own score by simply adding multiple inlinks to a site. The only advantage of link popularity over the other methods is its simplicity. The other two approaches—HITS and PageRank—are both promising techniques. It is more sensible to compute PageRank scores for a huge network such as the Web, than it is to compute Authority and Hub scores. The HITS method gets around this problem, typically, by doing the link analysis on a smaller subgraph of the whole graph. This subgraph is composed of the set of hits, their in- and out-neighbors, and the links between these documents.

In summary, the PageRank link analysis technique is applied to the whole graph, as in FIGS. 1 and 2. HITS and related techniques are, in contrast, applied to topic-related subgraphs, as shown in FIGS. 3 and 4. The tight coupling of the two types of scores in the HITS approach makes the application of the HITS method to the whole graph of dubious benefit. PageRank on the other hand has not to our knowledge been applied to subgraphs, and it is not clear what sort of results would be obtained.

What is required, as discovered by the present inventors, is an algorithm that may be used for the entire Web graph (as may PageRank), and yet one which (unlike PageRank) yields two distinct scores for each document. That is, the new algorithm should not use compound operators (thus avoiding known problems with the HITS method), and it should be possible to apply it either to the whole graph, or to a subset of documents which are confined to a single theme.

SUMMARY OF THE INVENTION

In view of the aforementioned short-comings of presently available schemes for hypertext link analysis, one objective of the present invention is to provide a rules-based method, and corresponding systems and computer based product, for ranking documents in a hyperlinked network.

In particular, an objective of the present invention is to provide a method, system, and computer program product capable of ranking a document via two distinct weights or scores associated with each node on a directed graph. The nodes of the graph are the documents, and the directed links are the hypertext pointers. As with other types of link-analysis algorithms, the invention uses the structure of the directed graph to obtain an importance weight for each node (document). Weights on the nodes are obtained by repeated application of an operator. The operator redistributes the weights that are present at each iteration. After many iterations, the weights cease to change, converging to steady values. These converged values are the importance weights for the nodes.

Specifically, an objective of the present invention is the development of a method, system, and computer program product for two new operators for finding node ranking weights: a non-normalized Forward operator F and a non-normalized Backward operator B. Unlike conventional methods, the method of this invention is intended to be used in both cases: either for the whole graph, or for a topic-related subgraph. The method is like PageRank in that it repeatedly propagates weights in a single direction (Forward or Backward) until a stable distribution of weights is obtained. However, unlike PageRank, the method allows the computation of both hub and authority scores for all pages in the whole graph. It is the decoupling of the two scores that makes the present method applicable (in contrast to HITS) to the whole graph. However, our method is also applicable to topic-related subgraphs. In this case, it is desirable to have two types of scores (hub and authority) for best results in navigating through the topic-related subgraph.

A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1:
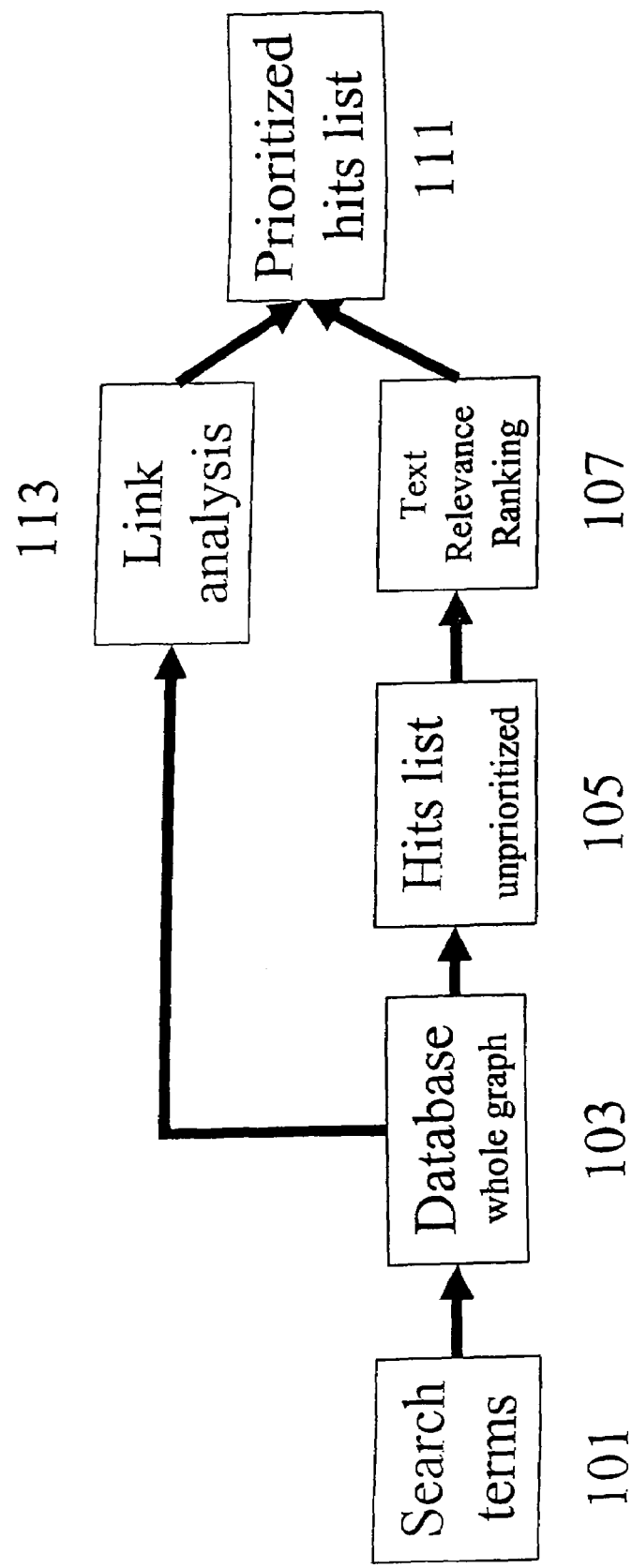
FIG. 1 depicts a conventional method for applying link analysis to an entire linked database (graph)
Figure 2:
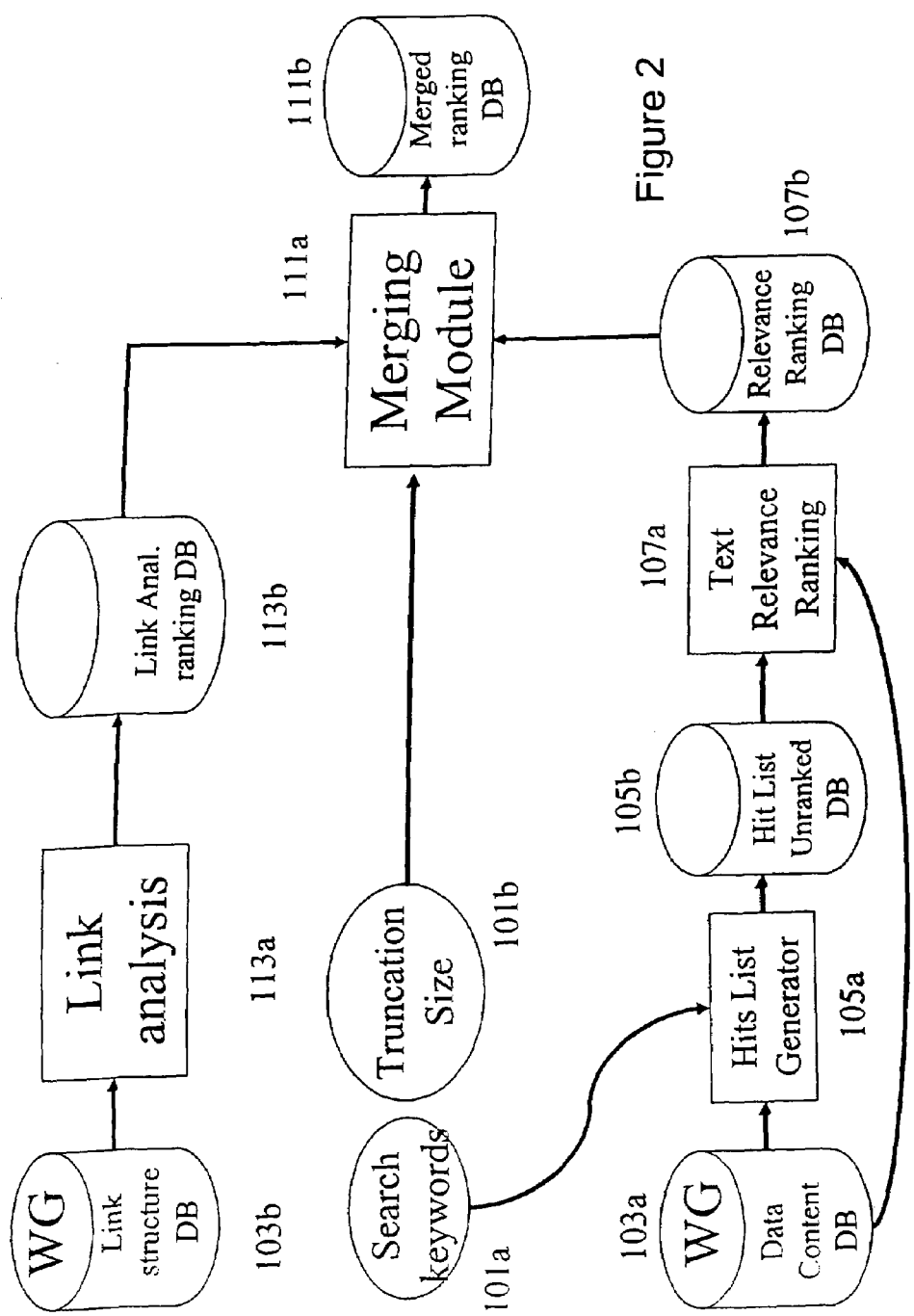
FIG. 2 depicts the architecture of a ranking mechanism corresponding to the method of FIG. 1, in which link analysis is applied to the whole graph.
Figure 3:
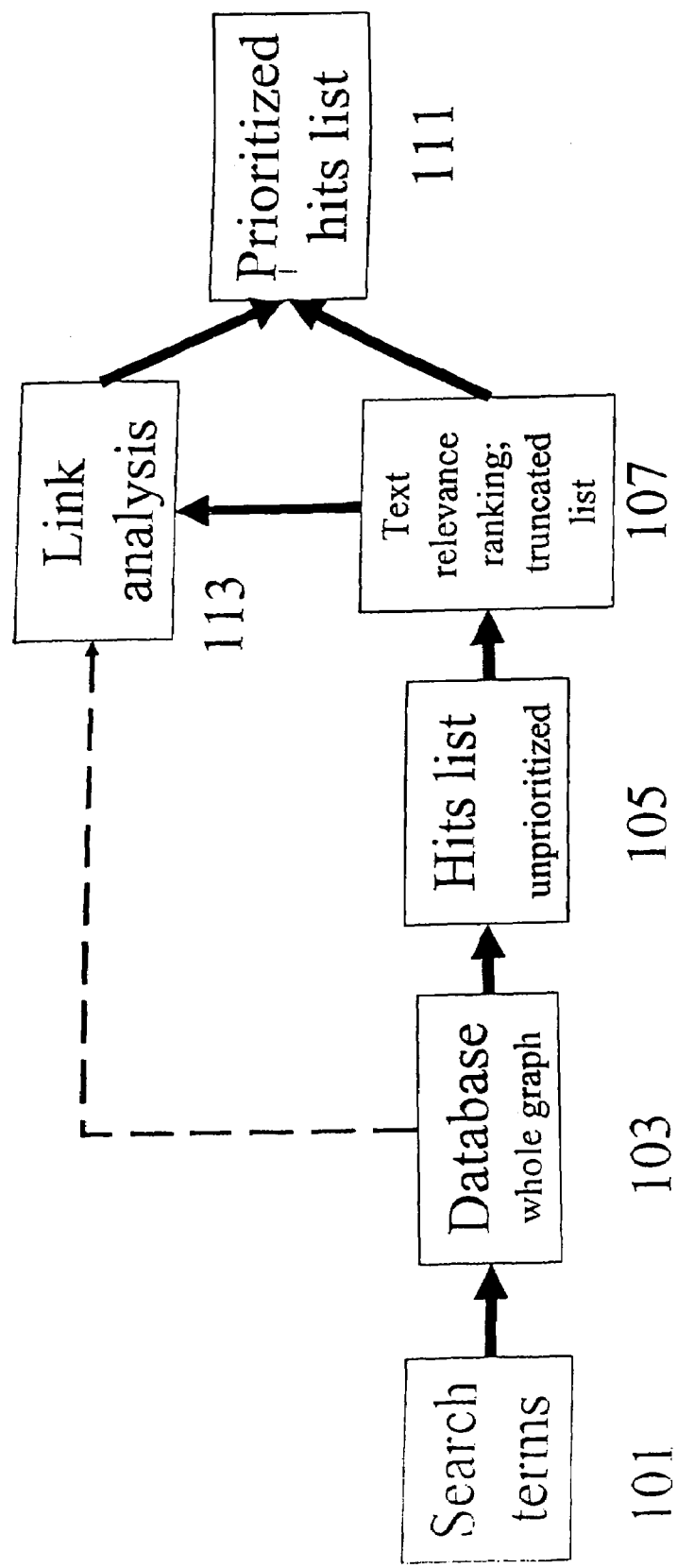
FIG. 3 depicts a conventional method for applying link analysis to a subset of documents which have been selected by a prior topic search.
Figure 4:
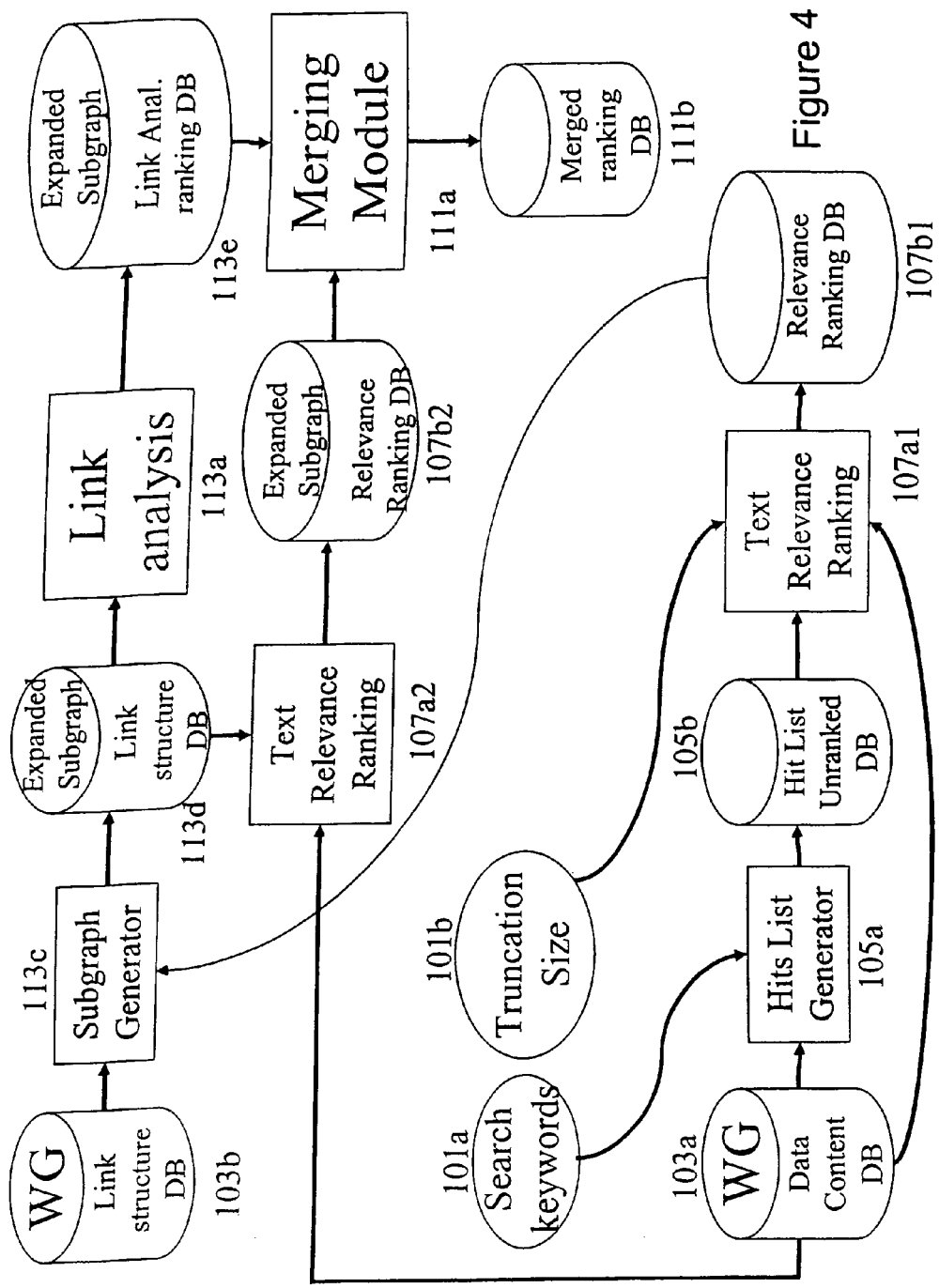
FIG. 4 depicts the architecture of a ranking mechanism corresponding to the method of FIG. 3, in which link analysis is applied to a subgraph.

In the present invention, the determination of weights of nodes in a graph requires repeated application of one of two non-normalized operators, hereinafter noted as the F operator and the B operator. In general, the weights change with each application; but after many iterations, the weights settle to stable values which are the result of the calculation.

First we discuss the implementation of the F operator. Let w(i) be the weight at node i at a given iteration. The F operation places the weight w(i) at each of the nodes j which are linked to i by a link pointing from i to j. F does this for every node i in the network. Hence the result of one application of F is:

$$w(j)(\text{new}) = \sum_{i \to j} w(i)(\text{old})$$

where $$\sum_{i \to j}$$

is the sum over those nodes i pointing to node j.

Since the total weight on the graph grows with each iteration, the weights must all periodically be reduced by a constant factor, in order to keep the weights from growing to numbers which cannot be handled by the computer doing the calculation. This reduction does not affect the relative values of the weights—and it is only the relative values which are needed for ranking purposes. We can call this reduction "normalizing" the weights, since it is simply a rescaling. Note that the weights must be regularly normalized in the course of the calculation, because the operator which is acting upon the weights is not normalized itself.

We can write the above symbolically as $$w(\text{new}) = F \cdot w(\text{old})$$

where w is the vector of weights and F is the non-normalized Forward operator—in fact, it is the transpose of the graph adjacency matrix.

This procedure suffers from the problem of sinks, just as does the normalized case. Hence the same remedy can be applied. Let R be the "randomizing" operator, which transfers weight from any node to any other with equal probability. R is thus a matrix of all 1's, except the diagonal elements are 0. Adding some probability of random jumps is then implemented by the following equation:

$$w(\text{new}) = (F + cR) \cdot w(\text{old}).$$

Here c is a free parameter which may be adjusted to give good performance.

Stable values for the weights are found when the relative values w(i)/w(i) cease to change, for all pairs of nodes. This condition is equivalent to the vector w changing its length, but not its direction. In other words, at convergence one obtains:

$$w = \lambda (F + cR) \cdot w$$

where λ is another constant whose value is unimportant for the ranking procedure. When the weights w obey the above equation, they give the relative ranking of the nodes according to hyperlink analysis.

Now we discuss the B operator. The non-normalized B operator is simply the transpose of F. That is, $B = F^T$. Hence B is the adjacency matrix of the directed graph. Otherwise, the procedure and discussion are the same as in the previous section. There will still be sinks with respect to B—these are areas of the graph from which arrows point out, but not in. Hence the R operator must also be included as above.

With these two operators, it is possible to employ two scores in ranking documents. And, like those previously described conventional methods which yield two scores, the two scores calculated by the present invention are analogous to the conventional scores of "being pointed to" (indegree, or Authority), and of "pointing to" (outdegree, or Hub). However, the two scores calculated by the present invention, while analogous, are mathematically and functionally distinct from the scores calculated by HITS at least because the two ranking calculations of the present invention are mathematically decoupled. We will see below that this can have important effects.

Also, the present invention differs from PageRank in at least two ways: (i) the present invention does not divide the weight by the outdegree when iterating the "weight propagation" step following the arrows; and (ii) the present invention calculates two scores, one based on Forward propagation (our F operator), and one based on Backward propagation (our B operator). PageRank uses only forward propagation, and does so in a different manner.

Finally, the present invention is clearly distinct from link popularity (as are PageRank and HITS) in that the weight of linking documents plays an important role—not just their number. This means that the present invention, like PageRank and HITS, is sensitive to the overall structure of the network of hyperlinked documents.

Figure 5:
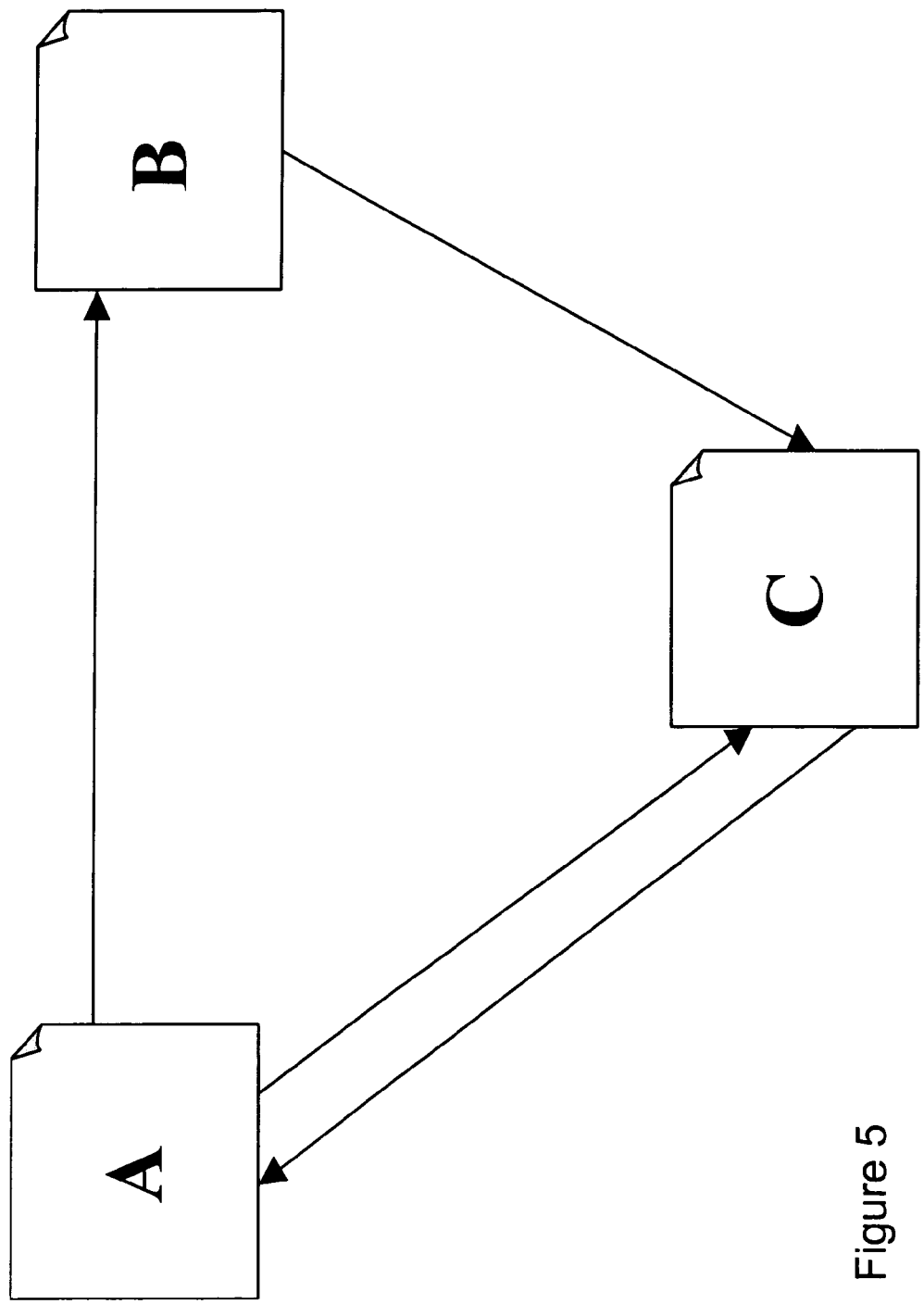
FIG. 5 depicts a first test case for the present invention.

Now we illustrate some differences between all these methods, using some simple hyperlinked graphs. FIG. 5 depicts a tiny hyperlinked graph, composed of three nodes, A, B, and C. This graph appears in the paper "The PageRank Citation Ranking: Bringing Order to the Web", by Page, Brin, Motwani, and Winograd (see also U.S. Pat. No. 6,285,999).

Table 1, below, illustrates the ranking scores for the three nodes in FIG. 5, obtained using the various methods. Here (and in FIG. 6), all the scores are scaled so that they sum to 1 in each column.

are likely to lead to good endpoints after a small number of further hops. As noted previously, the present invention uses the Forward operator to obtain authority-like scores and the Backward operator to obtain hub-like scores.

The naïve method (link popularity) gives node C the highest authority-like rank (i.e., indegree=0.5), and node A the highest hub-like rank (i.e., outdegree=0.5). The PageRank method fail to distinguish A from C (i.e., PageRank=0.4). The HITS method strongly singles out C as the highest Authority (i.e., Authority=0.62), and A as the best Hub (i.e., Hub=0.62). However, we see that HITS gives a rather extreme correction to the PageRank scores—for instance, it gives zero Authority to A.

The present invention remedies this overcorrection by decoupling the calculation of Authority and Hub scores—that is, by mathematically decoupling the Forward and Backward operations. The Forward calculation gives C as the highest authority-like weight (i.e., 0.43)—which is sensible—but, unlike HITS, also gives A the second highest authority-like weight (i.e., 0.32). This authority-like weight for A comes from the link C→A (pointing from C to A).

Note that, because of tie scores in some cases, all of the methods shown in Table 1 give different rankings for the case of authority-like scores and for the case of hub-like scores. Tie scores are, of course, rare in large graphs such as the WWW. However the point from this figure remains valid: that the present invention will give, in general, rankings which are distinct from those obtained from the other methods.

TABLE 1

| Node | Indegree (Popularity) "authority-like" weight | Outdegree (Popularity) "hub-like" weight | PageRank "authority-like" weight | HITS Authority weight | HITS Hub weight | Non-normalized Forward "authority-like" weight | Non-normalized Backward "hub-like" weight |
|---|---|---|---|---|---|---|---|
| A | 0.25 | 0.5 | 0.4 | 0 | 0.62 | 0.32 | 0.43 |
| B | 0.25 | 0.25 | 0.2 | 0.38 | 0.38 | 0.25 | 0.25 |
| C | 0.5 | 0.25 | 0.4 | 0.62 | 0 | 0.43 | 0.32 |

Here we have introduced some new language: henceforth, "authority-like weight" (without capitals) means the general "being-pointed-to weight" for any given method; and similarly "hub-like weight" is the "pointing-to" weight for any method. ("Authority" and "Hub" with capital letters will refer specifically to those scores obtained from the HITS method.) Both kinds of scores (i.e., authority-like and hub-like weights) are of interest to searchers: authorities are possible endpoints of a search, while hubs are places which We also see that the present invention gives results (at least with respect to authority-like scores) which are "intermediate" between the PageRank results and the HITS results. This is a result of the decoupling between the two calculations.

Figure 6:
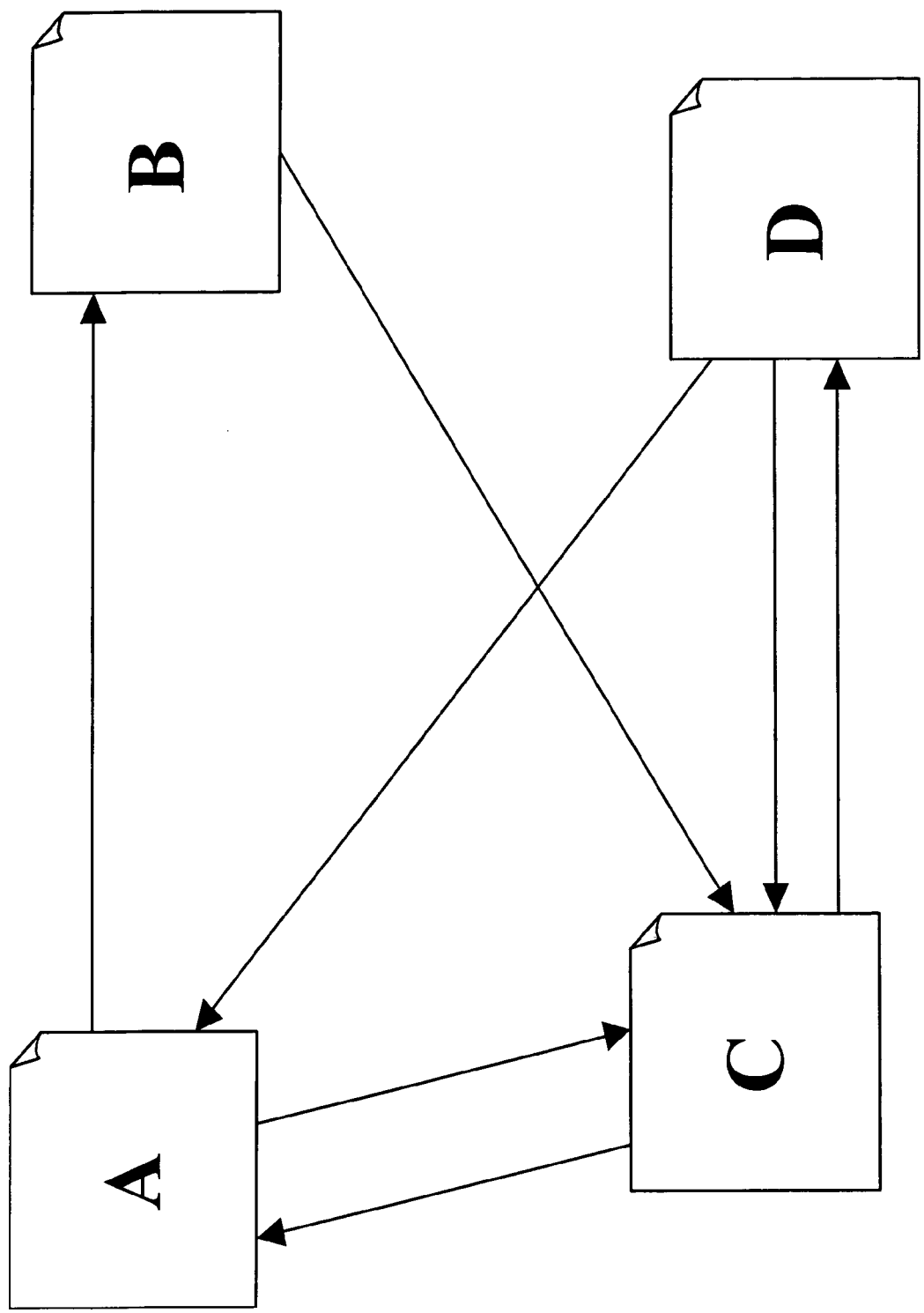
FIG. 6 depicts a second test case for the present invention.

In FIG. 6 we consider a second, more complicated example graph with four nodes: A, B, C, and D. Scores for the various methods, for each node in FIG. 6, are given in Table 2.

TABLE 2

| Node | Indegree (Popularity) "authority-like" weight | Outdegree (Popularity) "hub-like" weight | PageRank "authority-like" weight | HITS Authority weight | HITS Hub weight | Non-normalized Forward "authority-like" weight | Non-normalized Backward "hub-like" weight |
|---|---|---|---|---|---|---|---|
| A | 0.29 | 0.29 | 0.29 | 0.29 | 0.28 | 0.30 | 0.25 |
| B | 0.14 | 0.14 | 0.14 | 0.16 | 0.21 | 0.16 | 0.16 |
| C | 0.43 | 0.29 | 0.38 | 0.46 | 0.17 | 0.35 | 0.30 |
| D | 0.14 | 0.29 | 0.19 | 0.10 | 0.34 | 0.19 | 0.30 |

Since every other node points to C, it is the highest authority-like by any method. However, in this case, the hub-like scores are more unclear: which nodes are best at pointing to good nodes? Three of the four nodes have the same outdegree (i.e., 0.29). Note further that, even in large graphs, ties in outdegree will not be uncommon. Hence there is clearly a need for methods which go beyond the naïve approach.

PageRank gives no information on the hub-like rating of any node. Hence it is only possible to compare HITS with the present invention. HITS selects D as the best Hub, and A as second-best. This result is strongly influenced by the coupling to the Authority calculation: D and A come out on top because of their "mutually reinforcing" relationship (that is, links both ways) to the high Authority C. The present invention (see the "Backward" column) gives a different answer, finding both C and D to be the two best hubs. A is ranked third, because one of its two outlinks points to the rather marginal node B, whereas C and D point to "good" nodes (as rated by the present invention). Hence a user will be directed along different paths by the method of the current invention: nodes with high hub-like scores can be presented as "Worth following further," for example.

This example shows again that the different methods give different rankings. Each method has its own logic; but the results are distinct, and the user experience with the different methods will be different in many cases. Also, although Example 2 focused on comparing hub-like scores, it is clear that a simple reversal of all the arrows gives a graph which makes the same point for authority scores. Ties in indegree will be somewhat less common in large graphs such as the WWW or subgraphs of the same. However, there will still be cases where subtle differences beyond simple indegree will play an important role; and in such cases, the present invention will offer a different view of authority-like from that given by PageRank or HITS.

In calculating the scores, the present invention, like PageRank and HITS, finds the principal eigenvector of a matrix. The simplest and commonest method for finding the principal eigenvector of a matrix is the Power Method (see "PageRank Computation and the Structure of the Web: Experiments and Algorithms", by A. Arasu, J. Novak, A. Tomkins, and J. Tomlin. Technical Report, IBM Almaden Research Center, November 2001. http://citeseer.ni.nec-.com/arasu02pagerank.html, the contents of which are incorporated herein by reference). This method involves repeated multiplication on a vector of weights by the matrix. Multiplication on the weight vector by the matrix is equivalent to what we have called "weight propagation" above: it redistributes a set of weights according to a rule, following the arrows on the links either "with" the arrows (forward) or against them (backward). Repeated redistribution of the weights (with overall normalization of the total weight, for the present invention and for HITS) yields a steady distribution, which is the dominant or principal eigenvector. These are the scores which are used for ranking, as shown (for example) in Tables 1 and 2 above.

Figure 7:
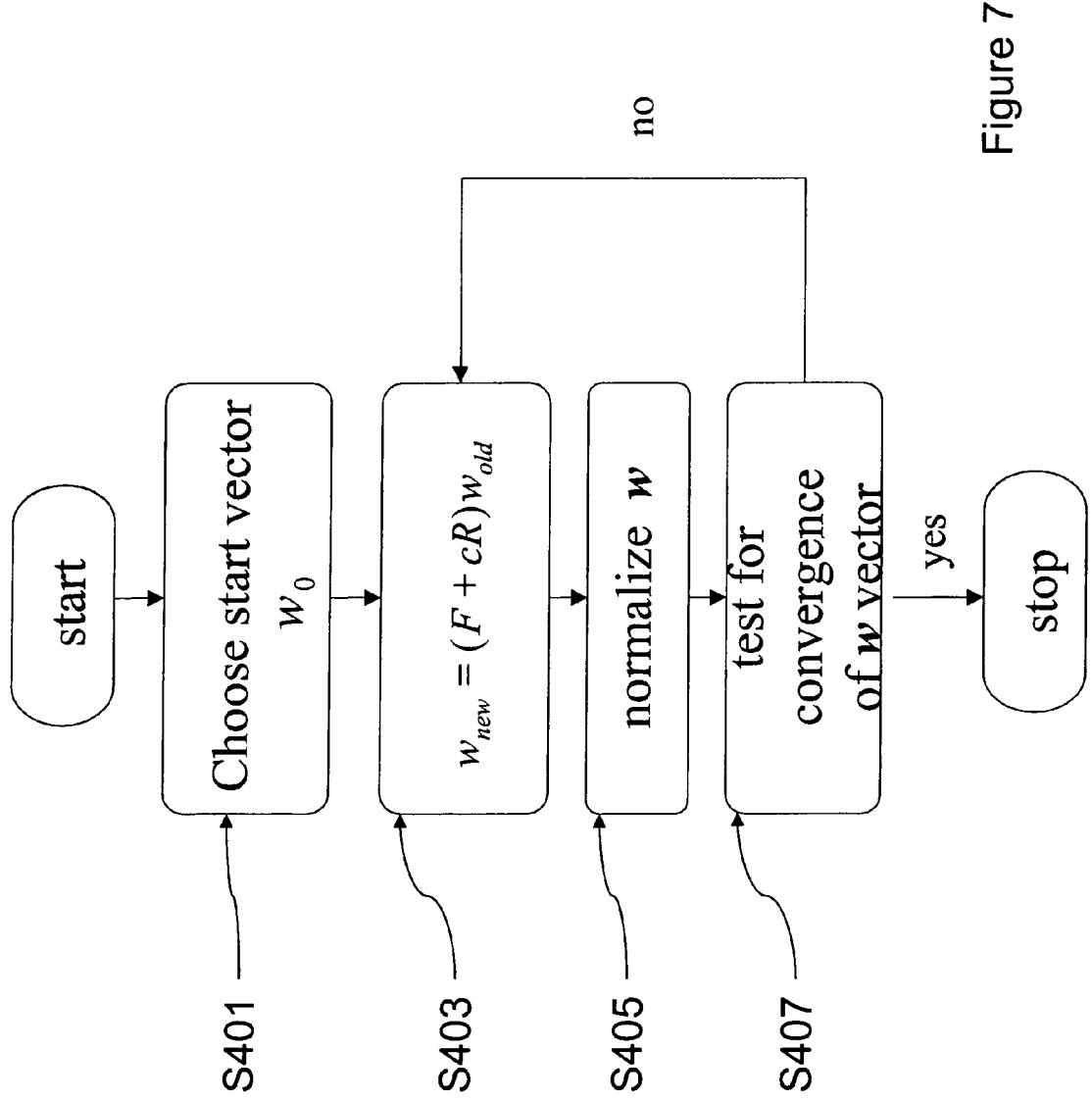
FIG. 7 is a flowchart associated with the present invention.

For clarity, we illustrate the application of the Power Method to the Forward operator in FIG. 7. Here, using the equations explained previously, the process starts and a start vector $w_0$ is chosen (S401). At each iteration, a new weight $w_{new}$ is calculated (S403) by redistributing the weights according to the action of the Forward operator, and probabilistically accounting for random jumps. This new weight is then normalized (S405). A convergence test is then performed (S407). If the weight has converged, the process ends. Otherwise, a new weight is calculated and process repeats until the weight converges. The flow diagram for the Backward operator is the same, after F is replaced by B.

There are, of course, other methods for finding the principal eigenvector (see, e.g., the previously identified paper by Arasu et al.) Each of these alternative methods fall within the scope of the present invention.

It is possible to place some of the benefits of the present invention in three categories: simplicity; quality; and applicability to other problems.

Regarding simplicity (and ignoring the naïve link popularity approach, which is the simplest), the HITS method seeks the principal eigenvectors for the two product matrices BF and FB (in our notation). Computing these product matrices is probably not the most efficient way to solve this problem for large graphs, since the multiplication of two large matrices is a time-costly operation (see "Efficient Matrix Multiplication on SIMD Computers," by P. Bjørstad, F. Manne, T. Sørevik, and M. Vajtersic; SIAM, J. Matrix Anal. Appl., 13 (1992), pp. 386-401, the contents of which are incorporated herein by reference). Thus the efficient approach to the HITS calculation involves repeated alternating multiplication of the weight vector by B and F. This is again the Power Method. PageRank also typically uses the Power Method. Hence the three methods (excluding degree counting, which is trivial) are roughly equal in complexity of calculation—all involve repeated application of a sparse N×N matrix (where N is the number of documents in the graph).

Regarding quality of the results, the present invention can give ranking results which are qualitatively distinct from, and more useful than, those obtained from known methods. Recall that PageRank only gives a single score for each document, which is of the type of score we call "authority-like" or "being pointed to by good documents". The present invention gives two scores with little increase in complexity, and hence offers two kinds of information about relevant documents found in a search.

HITS also gives two kinds of information about documents. However, the coupling of the calculation of these two scores can be disadvantageous. HITS is probably most useful to couple the two when—as envisioned when the HITS method was invented—the graph considered is already focused according to the topic of search. When all the documents are relevant to a single topic, it may make sense to judge hubs in terms of authorities, and vice versa. For larger graphs, it likely does not.

The present invention decouples the authority-like score calculation from the hub-like score calculation. As shown above, this may give results as good as or better than HITS, even for small and focused graphs. The present invention also has the advantage that it may be usefully applied to large, unfocused graphs.

Regarding other applications of the invention, the present invention, in common with the others discussed here, may be applied to any system which may be represented in the abstract as nodes connected by directed links. The application which is explicitly or implicitly assumed in all the previous discussion is to systems where the nodes are information documents, and the object is to rank documents found by a topic search.

In summary, the invention consists of a set of methods for using hypertext link analysis to rank documents which are linked together by hypertext links. It is clear from the above that the invention may be useful as a crucial component of a commercial Web search engine—and that is certainly one of the possible embodiments of the invention. A search engine typically complements the link analysis ranking, as accomplished by the present invention, with a text relevance ranking; however in principle the link analysis ranking can be done independently of the text relevance ranking. Furthermore, there are numerous other uses of the present invention.

For example, the present invention is useful in improving the hierarchical file-folder method of organizing content on personal computers (PCs). Today's hierarchal method of organizing is rapidly becoming inadequate for the average PC user. The problem is that search on a hierarchical tree is naturally inefficient. That is, present-day operating systems offer a way of searching for a particular file—namely, by exhaustive search. What if the user then wants all files related to a given file, or to a given topic? A hierarchical tree which links all files may seem like a solution; but it demands an effective way of organizing all kinds of information in a single tree—not a feasible goal for any user.

Instead, given the proliferation of information which can be and is being stored on each individual PC, one may expect that a more efficient searching mechanism will be needed in the near future. A set of integrated mechanisms, much like today's Web search engines, may be a highly useful way of searching individual content on a PC. For such a technique to be useful, provision must be made for the establishment of hypertext links between documents on the PC. These hypertext links may be made manually or automatically—preferably in both ways. They would preferably link all kinds of files. The result would be a "private Web", in which one's own documents were linked together in a Web-like directed graph. Given a private Web, the present invention would be useful for ranking hits on a user-initiated search through his/her own documents. The advantages articulated previously regarding web-analysis would apply here as well.

In addition, it is also possible to consider a different type of application for the present invention. One important aspect of running a system of files and users is security. One wishes to protect the system from damaging information, such as viruses, or leaked sensitive information. Protection then involves two goals: (i) preventing the introduction of such harmful information in the first place; and (ii) preventing or limiting the spread of such harmful information, in the event that it has been introduced into the system.

This user/file system may be represented as a directed graph. Files have read and write permissions for various groups of users; write permission is a directed link allowing information flow from user to file, and read permission is an arrow pointing the other way. Furthermore, ranking of nodes (users or files) may be a very useful tool toward goal (ii) above—preventing the spread of damage. One wishes to rank the nodes according to how large a role they may play in spreading: some (poorly connected nodes on the "edge" of the network) will play a marginal role, while others (highly central nodes) will play a large role. Ranking the nodes thus allows a system administrator to focus his or her energies on monitoring and protecting the highest-ranked nodes. A weight-propagation method like the ones discussed above can be useful for this problem. Let us then compare the various methods.

It is possible to rule out the naïve degree-counting approach immediately, as it gives little useful information about spreading; this method is confined to completely local information, and so can give high scores to nodes that are in fact rather isolated from the system. Next we consider PageRank. Since damaging information can duplicate itself each time it is passed over a link, it is not sensible, in ranking nodes, to divide by the outdegree of the node (as is done by the PageRank method). Also, the PageRank method yields only one type of information (score) about each node—namely, its "authority-like" score, which attempts to quantify how much the node is pointed to by important nodes. However, for limiting the spread of damage, one also wishes to know a node's "hub-like" score. Clearly, hubs are good at pointing to important nodes, hence at spreading damage to them. Authority nodes, on the other hand, are most exposed to damage, as they are the most "pointed to". Hence one wants both types of scores in order to best plan for the protection of the system.

The HITS method gives both types of scores. However, here the tight coupling of the calculation for the two scores may be a serious disadvantage. That is, for the purpose of damage spreading, a node should not get a big boost in its hub (spreader) score, simply because it points to a good authority (highly exposed node). Instead, a high hub score should imply that the node in question points to other good hubs (spreaders). This prescription is perfectly matched by the present invention, which simply iterates the Backward operator to evaluate hub scores.

Thus, in short, the present invention has significant advantages over the known methods (for using link analysis to rank nodes), when applied to the problem of limiting damage spreading on a user/file network. The same arguments likely hold for other types of systems for which damage spreading is an important issue; the only criterion which must be satisfied for the present invention to be applicable is that the links between the nodes be directed.

Figure 8:
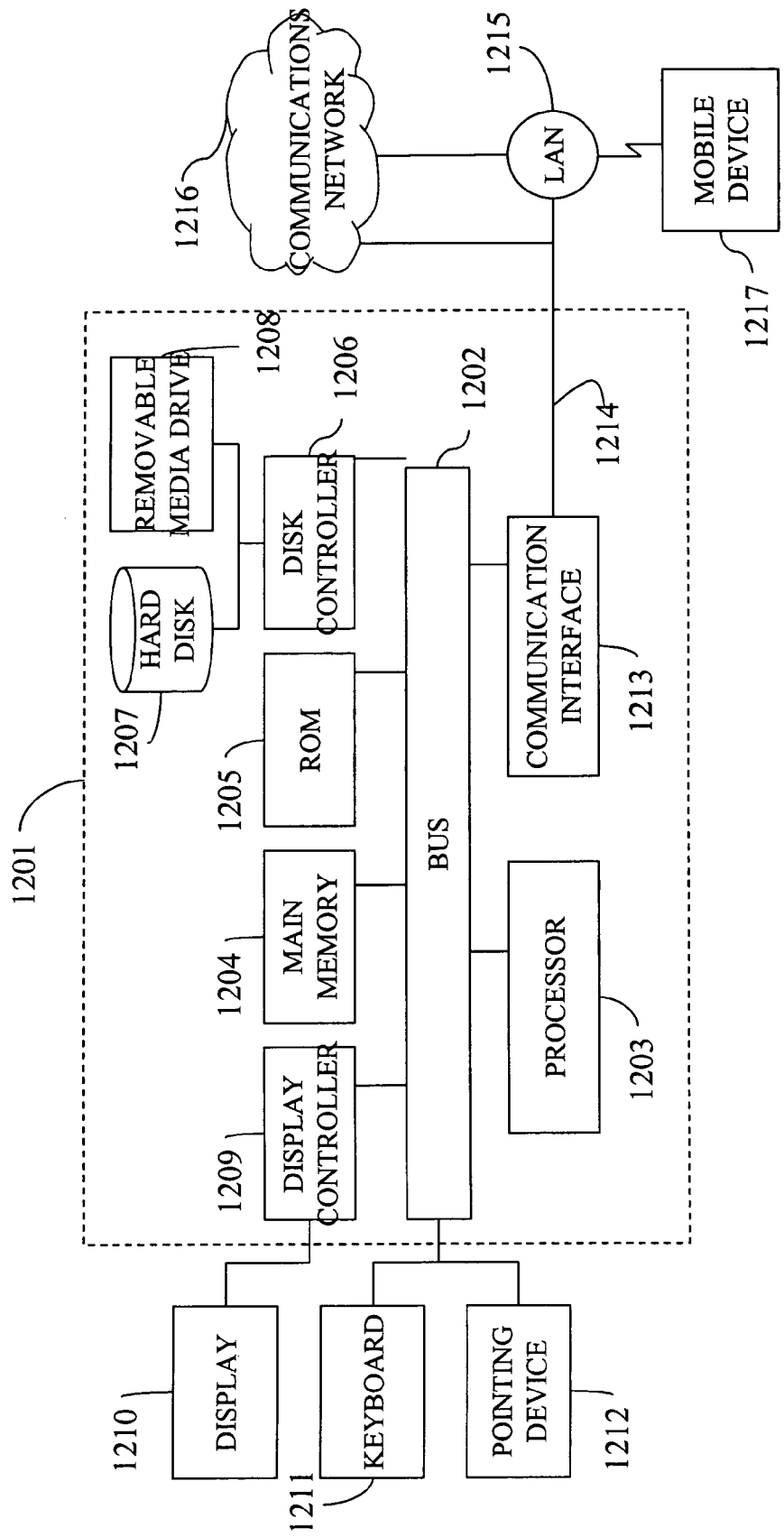
FIG. 8 is a block diagram of a computer system associated with the present invention.

FIG. 8 illustrates a computer system 1201 upon which an embodiment of the present invention may be implemented. Computer design is discussed in detail in STALLINGS, W., Computer Organization and Architecture, 4th ed., Upper Saddle River, N.J., Prentice Hall, 1996, the entire contents of which is incorporated herein by reference. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire, and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to a mobile device 1217 such as a personal digital assistant (PDA) laptop computer, or cellular telephone.

In summary, it should be clear from the discussion of existing algorithms that a non-normalized Forward operator F and a non-normalized Backward operator B can give very good link analysis results. More importantly, recalling the large difference between results for the SALSA and HITS techniques, removing the normalization from the PageRank f operation will have a nontrivial effect on any link analysis results. Also, using the unpaired Backwards operator, rather than the composite operators BF or FB, should give results which are different from any of the others. The extremely limited tests to date of the b operator hint that the results are meaningful. The non-normalized B operator is equally worthy of attention. Backward operators in general will likely give scores more in the spirit of the Hub scores of the HITS method.

Implementation of the invention for the purpose of ranking hits in a centralized Web search engine requires its integration with several other components: a text ranking system, an indexing system, a crawler, and a user interface. The invention, in this implementation, represents a part of a complete working search engine, and cannot be implemented in isolation from the other components of such a system.

The invention may also be implemented as part of a search engine operating over contents held on a single PC. This implementation requires the introduction of hyperlinks between all documents (mail, text, presentations, etc) stored on the PC (i.e., a "private Web".) This idea (hyperlinks between documents on a single PC) has, to our knowledge, only been realized to a very limited extent in present-day operating systems. Thus implementing the current invention as a part of the "private Web" would require modification of the many file-handling applications in a PC. In addition, an indexing system, a user interface, and (probably) a ranking system based on text relevance would be required.

Obviously numerous modifications and variations of the present invention are possible in light of the above teachings. It is therefore to be understood that within the scope of the appended claims, the invention may be practiced otherwise than specifically described herein.

What is claimed is:

1. A computer-implemented method of ranking a relevance of a node in a linked set of nodes, comprising:
   determining an authority weight for said node using a non-compound, non-normalized Forward operator and without using a Backward operator;
   determining a hub weight for said node using a non-compound, non-normalized Backward operator and without using a Forward operator such that said steps of determining are mathematically decoupled;
   ranking said relevance based upon said authority weight and said hub weight;
   searching, navigating or retrieving one or more information objects in one or more electronic archives based upon said ranking; and
   storing, displaying or transmitting a result based on said searching, navigating or retrieving.

2. The method of claim 1, wherein said determining an authority weight for said node comprises:
   choosing a forward start vector of initial authority weights of each node in the linked set of nodes;
   determining an updated vector of node weights using the non-compound, non-normalized Forward operator;
   normalizing the determined updated vector of node weights; and
   testing for convergence, wherein said steps of determining an updated vector of node weights and normalizing the determined updated vector of node weights are repeated until the node weight converges to a determined authority weight.

3. The method of claim 1, wherein said determining a hub weight for said node comprises:
   choosing a backward start vector of initial hub weights of each node in the linked set of nodes;
   determining an updated vector of node weights using the non-compound, non-normalized Backward operator;
   normalizing the determined updated vector of node weights; and
   testing for convergence, wherein said steps of determining an updated vector of node weights and normalizing the determined updated vector of node weights are repeated until the node weight converges to a determined hub weight.

4. The method of claim 1, said step of ranking said relevance comprising:
   determining a principal eigenvector of a matrix.

5. The method of claim 1, said step of ranking said relevance comprising:
   selecting a search term; and
   displaying a ranking result.

6. The method of claim 1, said step of ranking said relevance comprising:
   ranking the textual content of the node.

7. A system for ranking a relevance of a node in a linked set of nodes comprising:
   a calculator configured to calculate an authority weight for said node and a hub weight for said node, using, respectively, a non-compound, non-normalized Forward operator without using a Backward operator and a non-compound, non-normalized Backward operator without using a Forward operator such that said calculations are mathematically decoupled, said calculator further configured to rank said relevance based upon said authority weight and said hub weight; and
   a computer-based search engine configured to search, navigate or retrieve one or more information objects in one or more electronic archives based upon said ranked relevance, and to store, display or transmit a corresponding result.

8. The system of claim 7, wherein said calculator comprises:
   a calculator configured to
      accept as an input a forward start vector of initial authority weights of each node in the linked set of nodes;
      determine an updated vector of node weights using the non-compound, non-normalized Forward operator;
      normalize the determined updated vector of node weights;
      test for convergence; and
      to repeatedly determine an updated vector of node weights and normalize the determined updated vector of node weights until the node weight converges to a determined authority weight.

9. The system of claim 7, wherein said calculator comprises:
a calculator configured to
accept as an input a forward start vector of initial hub weights of each node in the linked set of nodes;
determine an updated vector of node weights using the non-compound, non-normalized Forward operator;
normalize the determined updated vector of node weights;
test for convergence; and
to repeatedly determine an updated vector of node weights and normalize the determined updated vector of node weights until the node weight converges to a determined hub weight.

10. The system of claim 7, said calculator comprising:
a calculator configured to calculate a principal eigenvector of a matrix.

11. The system of claim 7, further comprising:
a search term selection device connected to said calculator; and
a display connected to said calculator.

12. The system of claim 7, further comprising:
a textual content ranking mechanism connected to said calculator.

13. The system of claim 7, further comprising:
a relay module connected to said calculator and configured to relay a corresponding calculated authority weight and hub weight to a display.

14. A computer-implemented method of ranking a relevance of a node in a linked set of nodes, the improvement comprising:
determining one of
an authority weight for said node using a non-compound, non-normalized Forward operator and without using a Backward operator,
a hub weight for said node using a non-compound, non-normalized Backward operator and without using a Forward operator;
ranking said relevance based upon said one of an authority weight and a hub weight;
searching, navigating or retrieving one or more information objects in one or more electronic archives based upon said ranking; and
storing, displaying or transmitting a result based on said searching, navigating or retrieving.

15. The method of claim 14, wherein said determining an authority weight for said node comprises:
choosing a forward start vector of initial authority weights of each node in the linked set of nodes;
determining an updated vector of node weights using the non-compound, non-normalized Forward operator;
normalizing the determined updated vector of node weights; and
testing for convergence, wherein said steps of determining an updated vector of node weights and normalizing the determined updated vector of node weights are repeated until the node weight converges to determined authority weight.

16. The method of claim 14, wherein said determining a hub weight for said node comprises:
choosing a backward start vector of initial hub weights of each node in the linked set of nodes;
determining an updated vector of node weights using the non-compound, non-normalized Backward operator;
normalizing the determined updated vector of node weights; and
testing for convergence, wherein said steps of determining an updated vector of node weights and normalizing the determined updated vector of node weights are repeated until the node weight converges to determined hub weight.

17. The method of claim 14, said step of ranking said relevance comprising:
determining a principal eigenvector of a matrix.

18. The method of claim 14, said step of ranking said relevance comprising:
selecting a search term.

19. The method of claim 14, said step of ranking said relevance comprising:
ranking the textual content of the node.

20. A computer readable storage medium storing a computer program including instructions configured to cause a processor-based device to execute the steps of one of claims 1-6 and 14-19.

21. A system for ranking a relevance of a node in a linked set of nodes, comprising:
means for determining an authority weight for said node using a non-compound, non-normalized Forward operator without using a Backward operator;
means for determining a hub weight for said node using a non-compound, non-normalized Backward operator without using a Forward operator such that said means for determining an authority weight and said means for determining a hub weight are mathematically decoupled;
means for ranking said relevance based upon said authority weight and said hub weight;
means for searching, navigating or retrieving one or more information objects in one or more electronic archives based upon said ranking; and
means for storing, displaying or transmitting a result output from said means for searching, navigating or retrieving.

22. The system of claim 21, wherein said means for determining an authority weight for said node comprises:
means for choosing a forward start vector of initial authority weights of each node in the linked set of nodes;
means for determining an updated vector of node weights using the non-compound, non-normalized Forward operator;
means for normalizing the determined updated vector of node weights; and
means for testing for convergence, wherein said means for determining an updated vector of node weights and means for normalizing the determined updated vector of node weights are configured to repeat their respective operations until the node weight converges to determined authority weight.

23. The system of claim 21, wherein said means for determining a hub weight for said node comprises:
means for choosing a backward start vector of initial hub weights of each node in the linked set of nodes;
means for determining an updated vector of node weights using the non-compound, non-normalized Backward operator;
means for normalizing the determined updated vector of node weights; and
means for testing for convergence, wherein said means for determining an updated vector of node weights and means for normalizing the determined updated vector of node weights are configured to repeat their respective operations until the node weight converges to determined hub weight.

24. The system of claim 21, said means for ranking comprising:

means for determining a principal eigenvector of a matrix.

25. The system of claim 21, said means for ranking comprising:

means for selecting a search term; and means for displaying a ranking result.

26. The system of claim 21, said means for ranking comprising:

means for ranking the textual content of the node.

27. A system for ranking a relevance of a node in a linked set of nodes, the improvement comprising:

means for determining one of
an authority weight for said node using a non-compound, non-normalized Forward operator without using a Forward operator, and
a hub weight for said node using a non-compound, non-normalized Backward operator without using a Backward operator;

means for ranking said relevance based upon said one of an authority weight and a hub weight;

means for searching, navigating or retrieving one or more information objects in one or more electronic archives based upon said ranking; and means for storing, displaying or transmitting a result output from said means for searching, navigating or retrieving.

28. The system of claim 27, wherein said means for determining an authority weight for said node comprises:

means for choosing a forward start vector of initial authority weights of each node in the linked set of nodes;

means for determining an updated vector of node weights using the non-compound, non-normalized Forward operator;

means for normalizing the determined updated vector of node weights; and means for testing for convergence, wherein said means for determining an updated vector of node weights and means for normalizing the determined updated vector of node weights are configured to repeat their respective operations until the node weight converges to determined authority weight.

29. The system of claim 27, wherein said means for determining a hub weight for said node comprises:

means for choosing a backward start vector of initial hub weights of each node in the linked set of nodes;

means for determining an updated vector of node weights using the non-compound, non-normalized Backward operator;

means for normalizing the determined updated vector of node weights; and means for testing for convergence, wherein said means for determining an updated vector of node weights and means for normalizing the determined updated vector of node weights are configured to repeat their respective operations until the node weight converges to determined hub weight.

30. The system of claim 27, said means for ranking comprising:

means for determining a principal eigenvector of a matrix.

31. The system of claim 27, said means for ranking comprising:

means for selecting a search term.

32. The system of claim 27, said means for ranking comprising:

means for ranking the textual content of the node.

* * * * *